United States Patent [19]

Mertel et al.

[11] Patent Number: 4,855,581

[45] Date of Patent: Aug. 8, 1989

[54] DECODING OF BARCODES BY PREPROCESSING SCAN DATA

[75] Inventors: Michael E. Mertel, Renton; James E. Thomas, Seattle, both of Wash.

[73] Assignee: Microscan Systems Incorporated, Tukwila, Wash.

[21] Appl. No.: 208,736

[22] Filed: Jun. 17, 1988

[51] Int. Cl.$^4$ .............................................. G06K 7/10
[52] U.S. Cl. .................................... 235/462; 235/463
[58] Field of Search ................................ 235/462, 463

[56] References Cited

U.S. PATENT DOCUMENTS

| | | |
|---|---|---|
| 3,806,706 | 4/1974 | Hasslinger et al. . |
| 3,866,024 | 2/1975 | Williams . |
| 3,887,792 | 6/1975 | Williams . |
| 3,909,787 | 9/1975 | Laurer et al. . |
| 3,916,154 | 10/1975 | Hare ...................................... 235/462 |
| 3,986,000 | 10/1976 | McJohnson . |
| 4,014,514 | 8/1978 | Sherer et al. . |
| 4,074,852 | 2/1978 | Wescott et al. . |
| 4,175,693 | 11/1979 | Nakanishi . |
| 4,282,426 | 8/1981 | Neseem et al. . |
| 4,323,772 | 4/1982 | Serge . |
| 4,329,574 | 5/1982 | Jordan, Jr. . |
| 4,354,101 | 10/1982 | Hester et al. . |
| 4,438,327 | 3/1984 | Smith . |
| 4,602,152 | 7/1986 | Dittakavi . |

Primary Examiner—Harold I. Pitts
Attorney, Agent, or Firm—Larry A. Jackson

[57] ABSTRACT

Scanned barcodes represented by an electrical signal are preprocessed in a PLA and delivered to a microprocessor in a form that permits efficient final processing of the data. High speed edge detection produce edge markers for the control logic and counting circuits coupled with a Johnson state counter to logically sequence the processor. Logarithmic conversion compresses the counted time interval to a single data word that can most efficiently be processed by the host microprocessor. Logic between the preprocessor and the microprocessor transfer digital representations of each bar and space to preassigned respective areas in the microprocessor memory. Bar/space margin detection performs a ratiometric comparison of each bar and space to determine every occurrence of 10:1 ratios and both bar/space and space/bar. Pointer signal information is transferred to the microprocessor indicating precisely where in memory each 10:1 margin ratio is located. A digital filter excludes spurious bar/space width in the preprocessor.

20 Claims, 6 Drawing Sheets

DECODING OF BARCODES BY PREPROCESSING SCAN DATA

BACKGROUND OF THE INVENTION

The invention relates to a novel system for decoding high density barcode from a record medium at high rate of speed and more particularly to method and circuitry for special preprocessing of the high speed barcode data stream that is much too fast for a conventional microprocessor, and then completing decoding with such a microprocessor without loss of throughput speed.

As known, barcodes contain information encoded by the ratios of the widths and sequence of the black bars and intervening white spaces. The code may be read by rapidly sweeping a spot of light, with a rotating mirror, across the entire barcode pattern. Reflection of light from spaces and absorption at black bars are sensed by the scanner's photodetector causing a varying level signal to be inputted to the decoder. The relative signal level thus fluctuates with the bars and spaces and is representative of the coded bar pattern. Moving beam barcode scanning of high density barcodes can generate serial data streams containing pulses as short as 1 microsecond.

To decode such a high density barcode data stream, the time duration of all the bars and spaces (as represented by signal amplitudes) must be effectively measured and compared to valid code patterns. By contrast, in slow speed decoders, a conventional microprocessor is itself programmed to measure each bar and space, with its own relatively slow internal counters and store that digital representation of the bar/space width in memory. The ratios of adjacent bars and spaces are calculated by dividing one bar count by the other to obtain a series of ratios that comprise a valid coded character.

Using this technique, minimum bar times of about 12 microseconds are the approximate lower limit using a fairly fast 16 bit micro processor. However, this is an order of magnitude too slow for high speed moving beam scanners. Faster processors are available in the form of bit slice systems and sophisticated Digital Signal Processing chips; however, the cost and component count is prohibitive for many applications. Prior art decoders have employed hardware counters and DMA (direct memory access) controllers to measure the bars and spaces and put them directly into the microprocessor memory thus allowing higher scanning speeds. The problem with these known decoders is the excessive amount of hardware required, lack of adequate count range (without doing 16 bit data manipulation which is slow), and the presence of large amounts of extraneous background data in memory.

As described below, one of the features of the invention is to compress the input bar and space counts in a unique manner using a special log conversion of raw count information. One prior barcoding technique disclosed in U.S. Pat. No. 3,887,792 and also in U.S. Pat. No. 3,866,024 employs a logarithmic time base. By this prior art logarithmic technique, a reader can use the same scanner to decode from a high speed laser beam or a manually operated hand held wand. The technique disclosed in the above mentioned U.S. patents is a logarithmic technique but has drawbacks in not smoothly changing the log relationship and the time generator developed limits the decoder to a logarithmic base of two. Another prior art patent, U.S. Pat. No. 4,104,514 describes tailoring the logarithmic operation not limited to the base of 2 but does not effectively and optimally convert high density barcodes scanned by rapid beam scanners. Examples of other barcode decoders are disclosed in U.S. Pat. Nos. 4,282,426; 4,354,101 and 4,438,327.

SUMMARY OF THE INVENTION

The present invention provides an improved barcode decoder based on a preprocessor that embodies one or more of the following features:

1. Compression logic to compress an n' bit primary count of bar and space widths down to n bit counts compatible with a downstream n bit microprocessor using a log base that is ideally suited to the count range.

2. "Quiet Zone" determination logic employing subtraction of logs of successive counts (hence division) to find predetermined space to bar ratios called "margins".

3. Separation logic for bar and space count data that separates in memory addresses containing spaces and from addresses containing bars.

4. Flagging memory addresses that contain bar/space counts adjacent "Quiet Zone" margins.

5. Sequencing control logic comprising a Johnson counter that acts as the lower initial counts of the primary counter.

6. A digital filter circuit to exclude very narrow noise spikes in the barcode scan data by disregarding initial counts.

The preferred embodiment of the invention uses the following method of selecting a log base to match system requirements and to implement the hardware to accomplish the logarithmic compression operation.

To allow high speed processing and keep hardware costs to a minimum, the preprocessing is performed by a programmed gate (logic) array, and an 8 bit integrated host microprocessor is used having an $n=8$ bit word length. Maximum processing speed can only be achieved if each count is represented by a single 8 bit byte, giving a maximum count of 2 raised to the 8th power or 256. This count range is not nearly great enough to accommodate a high performance moving beam scanner with a large depth of field. The greater the working range (depth of field), the larger the permissible variation in the speed of the spot that traverses the bar. The capacity of the counters must be sufficient to accumulate the total count without overflow at the lowest anticipated reading speed. Conversely, at the highest anticipated reading speed the number of counts per element must be great enough that quantization errors will not cause decoding errors. While a count range of 256 can be used successfully in a number of applications, it limits the performance of scanners having a large depth of field.

Increasing the count range to 1024, for example, allows the decoder to be used with most high speed scanners over a wide variety of conditions without the need for any adjustments. To extend the range of the count from 256 to 1024 and eliminate the complexities associated with division operations to provide the desired ratio information, methods and devices employing logarithmic techniques have been developed. The use of logarithmic compression allows a division process to be reduced to a simple subtraction operation which can be performed much faster by a microprocessor.

In the preferred embodiment, the logarithmic conversion is performed with a lookup table residing in a Read Only Memory (ROM) associated with the PLA preprocessor. This technique saves a tremendous amount of processing time for the microprocessor and allows a wide dynamic count range using n=8 bit counts resulting in additional time savings at no cost in performance. The efficiencies introduced by the present invention include using the same ROM to implement a hardware divider that is used to determine whether a predetermined bar/space ratio has occurred, allowing a much smaller, less expensive and lower cost decoder than heretofore thought possible by the use of prior art techniques.

Since only $2^n = 256$ log values are available, assuming only n=8 bit representation of each count, it is important in the interest of achieving maximum resolution to choose the log base carefully. In systems employing only microprocessors, a base of 2 is a common choice. However, this results in reduced resolution, especially in the low count range. If base 2 were used as the log base to represent counts ranging from 8 to 1024, it would require manipulating fractional numbers, which is slow and cumbersome with a microprocessor.

Additionally, with one byte representing each count, the accuracy in the low counts degrades to as much as ±5%

Since each element in a barcode reader introduces some error, even ±5% is worth reducing, especially if it can be obtained without additional hardware. Decoders employing logarithmic time base generators, such as the type disclosed in U.S. Pat. No. 4,104,514, would require an excessive amount of hardware to implement in a high speed decoder such as the one described in the present invention.

Also, the preferred embodiment of the preprocessor as disclosed herein includes relatively high speed edge detection logic that produces edge markers for the control logic, and counting circuits that are coupled with a Johnson state counter to logically sequence the preprocessor. The above described logarithmic conversion compresses the counted time interval to a single data word that can most efficiently be processed by the host microprocessor. Control circuitry provided between the preprocessor and the microprocessor transfers digital representations of each bar and space to their respective areas in the microprocessor memory. Bar/space comparator means for performing a ratiometric comparison of each bar and space to determine every occurrence of predetermined ratios, e.g. 10:1, of both bar/space and space/bar. Pointer information is transferred to the host microprocessor indicating precisely where in data memory each 10:1 ratio is located. The preprocessor of the serial data stream includes an $n'$ bit binary counter of $2^{n'}$ capacity and is operated to perform a digital filter function to ignore all counts below a given minimum thereby filtering out spurious input noise.

BRIEF DESCRIPTION OF THE DRAWINGS

These and other features of the present invention will be more fully appreciated when considered in the light of the following specification and drawings in which.

BRIEF DESCRIPTION OF THE DRAWINGS

Figure 1:
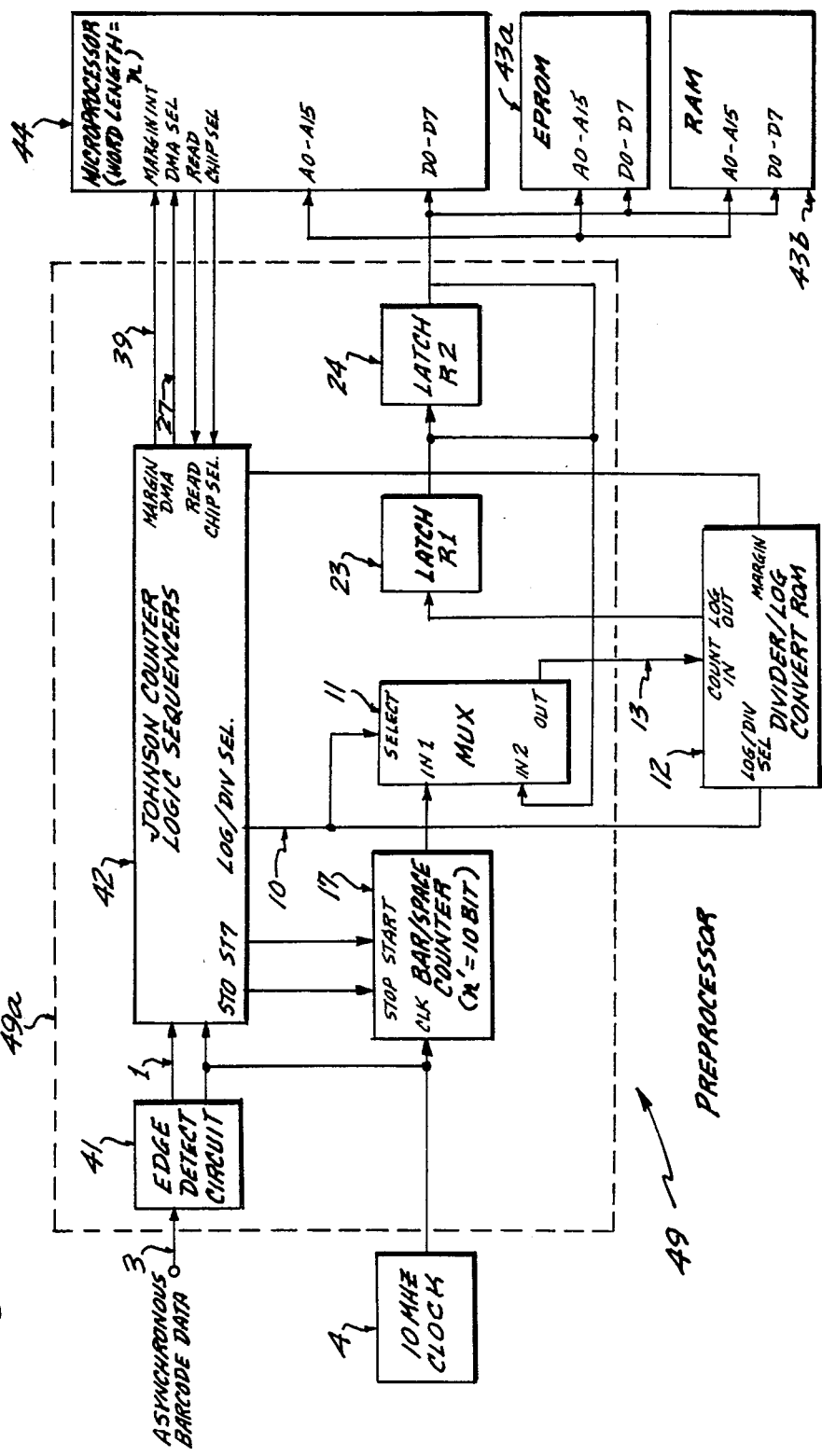
FIG. 1 is a block diagram of a barcode decoder in accordance with the preferred embodiment utilizing a programmable gate-array coupled with a relatively highly integrated host microprocessor.

The invention will now be disclosed in detail to show examples of how the above concepts may be implemented for reading barcodes.

It is one of the intents of the present invention to represent bar/space count data C, for example having a maximum of 1024 numbers, with one n=8 bit byte for downstream decoding of barcode data while maintaining the highest possible accuracy and implemented with the least amount of hardware.

The log conversion is preferably done with a ROM lookup table and thus we are free to choose any log base desired. As was mentioned earlier, log base 2 seems an obvious choice when using a microprocessor; however, in our case, the resolution is not adequate. It would be more efficient to select a log base that was perfectly tailored to the log range and count range being used. The following expression will give the log base as a function of log values available and highest count desired.

Where the highest desired primary count=C and the number of values for the log=L
Then:

$$\text{Log base } b = 10^{(\text{Log } C)/L} \tag{1}$$

Using, for example L=256, as a nonfractional log number to represent C=1024 count range, the resulting log base b=1.02811 limits the conversion error to a maximum of 1.3%. Since 256 can be efficiently represented as a binary 8 bit word, the n=8 bit logarithmic representations of bar/space widths are then passed on to the 8 bit microprocessor via direct memory access (DMA). Furthermore, the ratios for determining margins can then be determined by high speed subtraction of one value from the other using a ROM lookup table.

To further increase the throughput speed of decoding by the microprocessor, the locations of key areas in memory, such as bar/space counts next to margins, are flagged. Knowing exactly where in RAM memory the margins of 10:1 are located saves the microprocessor the time of scrolling through memory searching for these ratios. In addition, with a simple subtraction of memory address locations it can be ascertained whether enough counts are present between the two framing ratios to form a valid barcode field. Additionally, the preprocessor automatically places the bars in odd memory locations of RAM and the spaces in even memory locations thus passing on the absolute bar/space information that would normally require a larger data word to be transferred between the preprocessor and the host microprocessor.

The margins or "quiet zones" as they are more commonly referred to, are the specified areas, both preceding and following the coded bar pattern that are required to be white and free of any marks that could cause a change in the barcode input signal. This white space must be at least 10 times the width of the narrowest element found in the coded bar pattern for the label to be valid. This requirement helps prevent truncating labels and reading valid barcode from random patterns.

A key element in the logic control of the preprocessor is an 8 stage Johnson counter that is used to identify specific master clock cycles and initiate various actions. The primary advantage of a Johnson counter is that it doesn't require numerous decode gates to identify cycles thus saving more hardware.

With the above concepts in mind, the implementation of the concepts of the present invention can be examined with reference to the drawing. In FIG. 1, the general organization of a hardware embodiment for implementing a preprocessor 49 is shown. The input to such a barcode decoder is the black/white digital signal from a moving beam barcode scanner. The signal from the scanner is coupled to an edge detector circuit 41 that is clocked by the master clock 4 and can resolve the edge of the digital barcode signal to within one time period of the master clock 4. The edge detector 41 generates a positive pulse at each rising or falling edge of the barcode signal 3. The output of the edge detector 41 is coupled to the Johnson counter logic sequencers 42 which control the starting and stopping of the n'=10 bit bar/space counter 17 as well as numerous other functions that will be explained later.

A Johnson counter is a binary counter designed specifically to count states. Instead of a binary sequenced output it has multiple discrete outputs that become active in sequence as the input is toggled, thus indicating how many pulses have been received. With this general functional description of the Johnson counter logic sequencers 42 in mind the relationship of the bar counter 17 the 10 bit multiplexer 11 and the log conversion and margin detecting can be explained in more detail. Each time a pulse is received the logic sequencers 42 stops the bar/space counter 17, latches the count and starts the counter 17 counting the next interval. At the same time a delay is initiated to allow time for the divider/log convert ROM 12 to convert the latched count 13 to an 8 bit log value L that will then be saved by latch R1 23 so it can be compared to the next count and determine if a 10:1 difference exists between the two counts. The logic sequencers 42 then activate the log/div select line 10 which causes multiplexer (MUX) 11 to select the most significant 5 bits of latch R1 23 and latch R2 24 and couple them to the divider/log convert ROM 12 to calculate the ratio between the two. Latch R1 23 holds the most recent count while latch R2 24 holds the count previous to that. The log/div select signal 10 also switches the divider/log convert ROM 12 to the divide table section of the ROM. If a 10:1 or greater ratio exists between the two counts, a margin interrupt signal 39 will be activated by the logic sequencers 42 alerting the microprocessor 44 that a margin has just been detected.

The microprocessor 44 then builds a lookup table of all the addresses in RAM 43b where the 10:1 margin ratios reside. The logic sequencers 42 then request the microprocessor 44 to perform a direct memory access operation by activating the DMA request line 27. A direct memory access (DMA) is an extremely fast and efficient way to enter data into a microprocessors memory. The operation is transparent to the execution of the microprocessor program as the microprocessor is very briefly halted while a DMA circuit, resident on the microprocessor 44 chip in a highly integrated microprocessor such as a Hitachi the HD64180, takes brief control of the address and data lines of the microprocessor and stores the data into RAM 43b.

The logic sequencers 42 then reset and begin the sequence all over again until the microprocessor 44 decodes a valid barcode label, at which time the microprocessor simply ignores any further DMA requests until it wishes to read another barcode.

Figure 2:
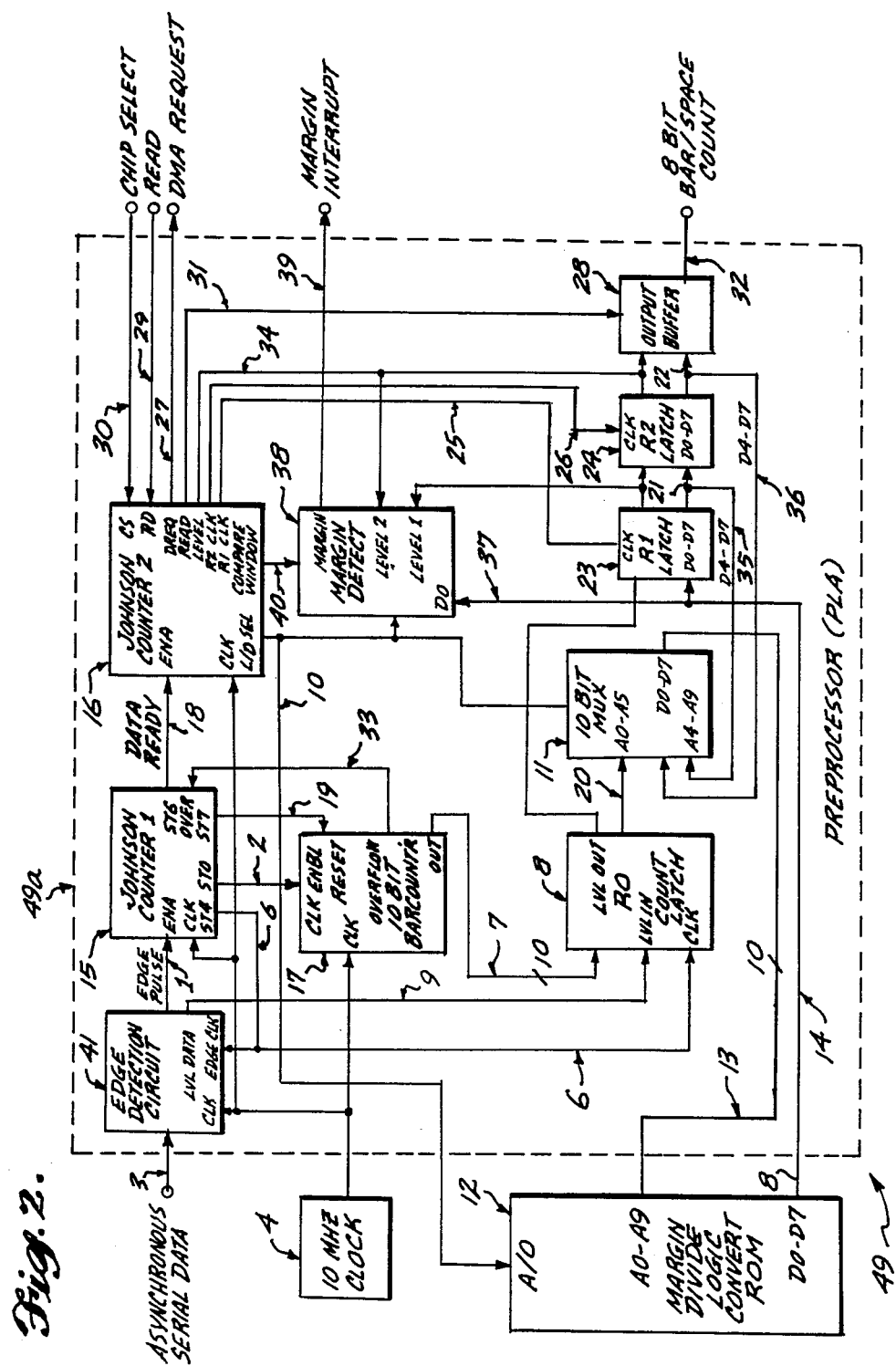
FIG. 2 is a detailed block diagram of the preprocessor used in the decoder of FIG. 1.
Figure 3:
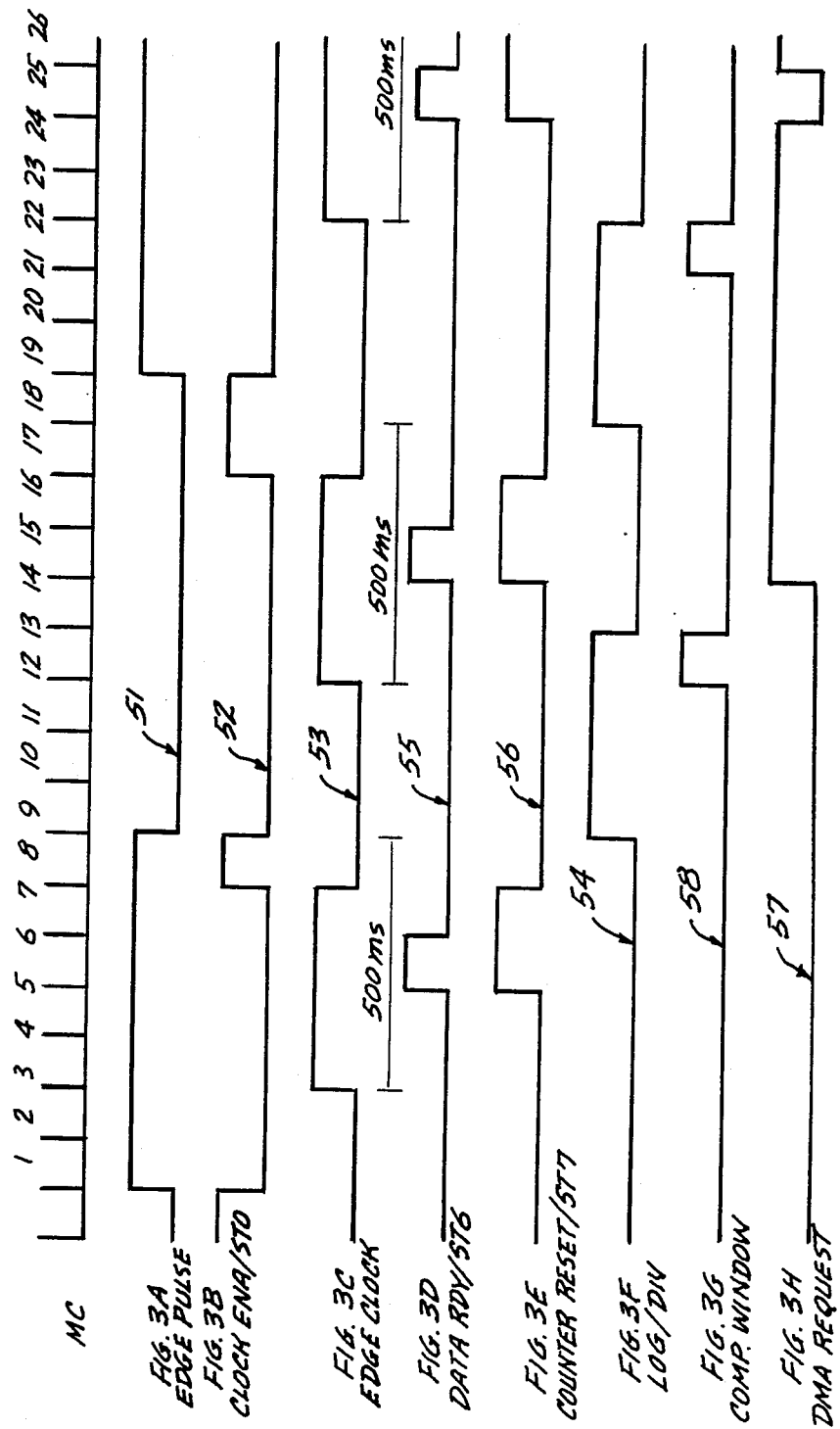
FIGS. 3A-3H are graphical illustrations of the waveforms appearing at various parts of the diagram of FIG. 2.

From the above description the operation of the preprocessor can be examined in more detail. FIG. 2 is a detailed block diagram of the preprocessor 49 and its interface to the microprocessor 44 and the timing relationships of the preprocessor functions are shown in FIG. 3. Preprocessor 49 is preferably implemented using a programmable logic array (PLA) 49a as shown. The Johnson counter logic sequencers 42 shown in FIG. 1 are comprised essentially of an 8 state first Johnson counter 15 and a 6 state second Johnson counter 16 as depicted in FIG. 2. The Johnson counters 15 and 16 are clocked by the master clock 4 and advance one state for each master clock cycle, thus, with the master clock 4 being 10 MHZ each state of the Johnson counter equals 100 ns. Johnson counter 15 detects the rising edge of the edge detector pulse 51 on line 1 and sets the clock enable signal 52 low on line 2 stopping the bar/space counter 17 at its current count. No other action occurs until the fourth state of Johnson counter 15.

If the level of the barcode input 3 has not changed states since the last rising edge of the edge pulse 51 on line 1 the transition of the barcode input 3 is declared valid. The Johnson counter sets the edge clock signal 53 on line 6 high which latches the edge pulse signal 51 on line 3 and also latches the barcount data on line 7 in count latch R0 8. The level data on line 9 is also latched into count latch R0 8.

The purpose of the 4 state delay, 400 ns, of Johnson counter 15 is to form a digital filter to exclude very short spurious pulses on the barcode signal that are caused by either specular light reflections or high frequency random noise. The log/div signal 54 on line 10 is at a low level at this time which causes the 10 bit multiplexer 11 to couple the latched barcount data at count latch R0 8 to the margin divide/log convert ROM 12 via line 13. Signal 54 also selects the ROM 12 to address the log conversion portion of it's memory. No other action occurs until the 6th state of Johnson counter 15, this delay is necessary to allow for the propagation delay time of the ROM 12.

The data ready signal 55 on line 18 then goes high flagging Johnson counter 16 that a new count is ready. On the seventh state of Johnson counter 15 the counter reset signal 56 on line 19 goes high presetting the barcounter 17 to a count of 8. Since the barcounter 17 was not being clocked during the 8 states of Johnson counter 15 this is a necessary compensation or the next count would be in error by 8 counts.

The next master clock 4 sets Johnson counter 15 back to the first state and the barcounter 17 begins counting again. The cycle then repeats itself. Johnson counter 16 controls the signal 54 on line 10 which determines whether the primary count data on line 20 will be converted to logarithmic form by the log conversion portion of ROM 12, or whether the R1 latched data on line 21 and the R2 latched data on line 22 will be divided (subtract logs) by ROM 12 to find a margin ratio.

Johnson counter 16 also controls the progression of the log count data through the latches R1 23 and R2 24 as well as the interface to the microprocessor 44. With the above in mind, we will examine the operation of the remainder of the preprocessor 49 in more detail. When the data ready signal 55 on line 18 goes high Johnson counter 16 begins to count master clock pulses. The first state activates the R2 clock line 26 that causes the data currently in latch R1 23 to be latched into latch R2 26. The DMA request signal 57 on line 27 goes high requesting the microprocessor to perform a DMA cycle which moves the data from the output buffer 28 into the microprocessor RAM memory 43b. During the DMA cycle, the read line 29 is activated by the microprocessor which tells the Johnson counter 16 that the data has been received by the microprocessor 44. If the read line 29 is never activated the preprocessor suspends all operations until the microprocessor reads the current data in the output buffer 28.

The microprocessor 44 must activate the chip select line 30 before it can read the data at the output buffer 28. Upon activation of the chip select line 30 the Johnson counter 16 logic activates the read line 31 which activates the normally disabled outputs of the output buffer 28 allowing the RAM 43b to load the data.

Bar and space counts are separated in RAM 43b with the bar counts residing in odd numbered RAM locations and the space counts residing in even numbered locations. This separation is accomplished by synchronizing the DMA address and the bar count data. On the very first DMA cycle the preprocessor checks line 34 to see if the bar count data on line 32 is a white level. If it isn't, the microprocessor increments the DMA address and reads the same data again putting it in the second memory address location in the barcount RAM memory area.

From this point on, a level data logic, such as a flip-flop, associated with Johnson counter 16 is toggled each time a DMA cycle occurs. If this flip-flop ever gets out of sync with the level data signal 34, an additional DMA cycle is forced thus causing the RAM address to be in sync with the level data once again. This procedure insures that white counts will always be in even address locations and black counts will be in odd locations of RAM. One consequence of doing this synchronization process is that the very first address of the RAM may contain a bogus count, however, it has no negative effect on the decoding algorithm. An additional advantage of this synchronization feature is accommodating overflows of the bar/space counter 17. Whenever the barcode input signal 3 remains in one state for more than 1024 counts, the counter 17 generates an overflow signal 33 and the count is latched in count latch R0 8 just as if a normal edge pulse 51 on line 1 had occurred. The only difference between an overflow of the counter 17 and an actual edge occurrence is that the edge clock signal 53 on line 6 does not change. This allows the microprocessor to keep track of how many overflows have occurred without losing the synchronization of the bars and spaces with memory addresses. If an odd number of overflows occurs it will cause a bar count to be put into a white memory location. When this situation occurs, the Johnson counter 16 detects that the level data signal 34 is out of sync with the level data flip-flop in Johnson counter 16 logic and activates the DMA request signal 57 on line 27 that causes an additional read of the barcount data currently in the output buffer 28 thus making the DMA address correct once more.

At state two of Johnson counter 16, the R1 clk signal on line 25 is activated latching the pending count in log form on line 14 into R1 latch 23. At state 3 of Johnson counter 16 the signal 54 on line 10 is activated thus coupling the most significant 5 bits of R1 latch 23 on line 35 and the most significant 5 bits of R2 latch 24 on line 36 to the ROM 12 which is now selected to the divide portion of its memory. The two successive log counts in R1 latch 23 and R2 latch 24, respectively, will now be divided (subtract logs) one into the other to determine if the ratio between them is greater than or less than a predetermined margin such as 10:1. At state 5 of Johnson counter 16 the result on D0 of line 14 of ROM 12 will be valid and the compare window signal 8 on line 40 is activated thus enabling the margin detect circuit 38. If it is greater than 10:1, a bit on line 37 is activated flagging a 10:1 ratio to the margin detect logic 38. Margin interrupt signal on line 39 is then activated causing the microprocessor to immediately mark the current DMA address in a lookup table in RAM 43b so margins can easily be located by the microprocessor 44. Johnson counter 16 then returns to state zero until another data ready signal 55 occurs.

Figure 4:
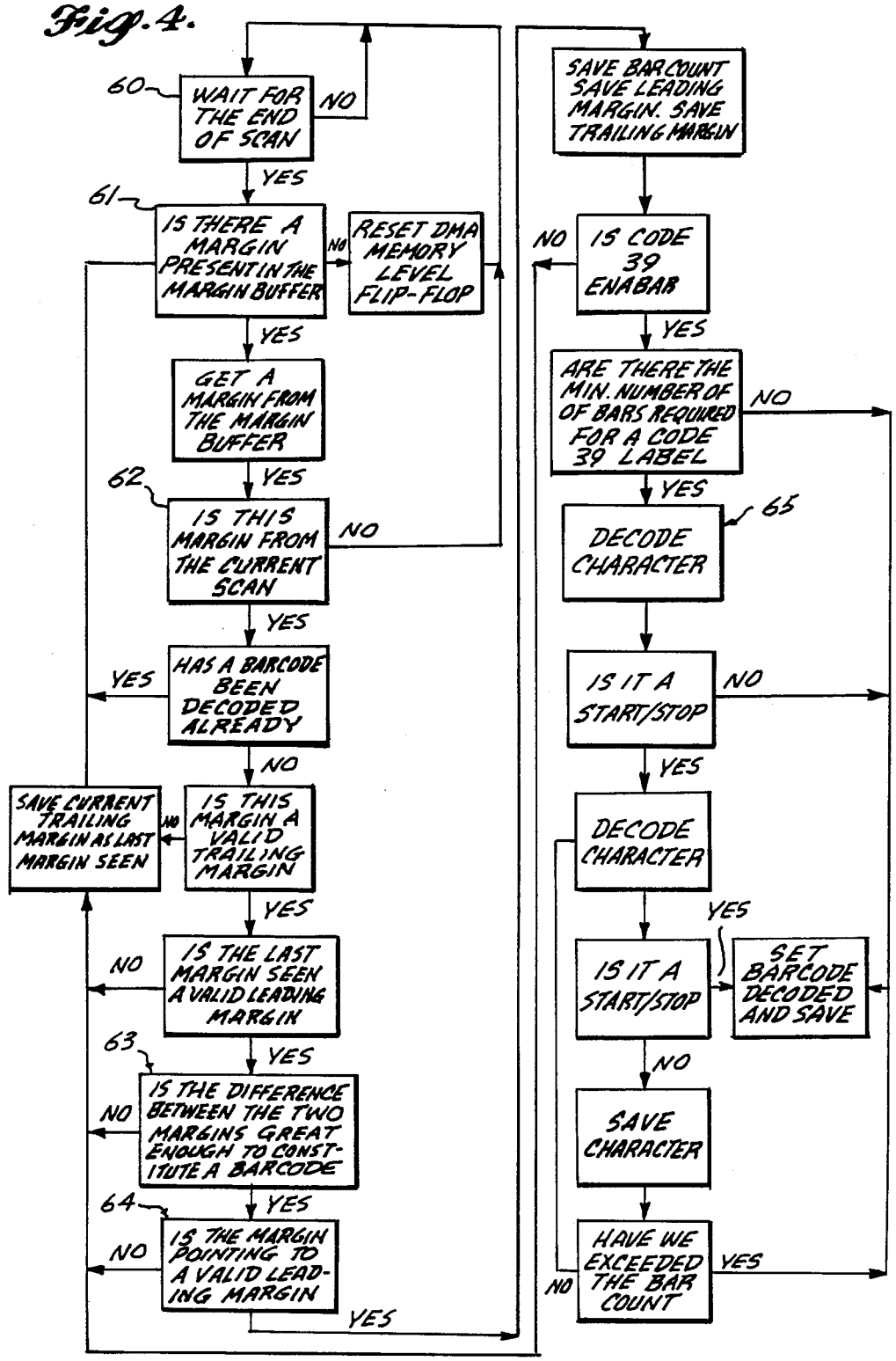
FIG. 4 comprises a logic flow diagram of the operations performed by the microprocessor of FIG. 1.

With reference to FIG. 4, the counts in RAM memory are marked so each scan is delimited in memory as indicated at 60 to prevent appending counts from one scan to the other thus causing erroneous decoding. Then, as shown in the program flow chart of FIG. 4, Later after locating both a leading and a trailing margin at 61 and 62, the program of microprocessor 44 checks to see if there are enough counts between the two margins for a minimum length barcode 63. Block 64 simply tests to see if the margin located is a white to black margin and not a black to white margin which is invalid for a leading margin. The remainder of the flowchart is relatively self explanatory as to the sequence of events to decode the data. The program controlling microprocessor 44 and set forth in FIG. 4 is stored in EPROM 43a.

In block 65 two important things that were done by the preprocessor 49 increase the decoding speed significantly. The first is having the counts in logarithmic form. Then any of well known character decode algorithms programmed in microprocessor 44 cause each count to be ratiometrically compared with another count. To divide two numbers in logarithmic form, you simply subtract them saving the time of a divide which would take at least four times longer. Additionally, the log base that was chosen above allows all the logs to be expressed as integers so the processor does not have to do fractional arithmetic. The second feature is having the bars and spaces identified in memory by their addresses. Since the decode algorithm typically compares bars to bars and spaces to spaces to help reduce optical distortion effects, knowing exactly where all of the bar and space counts reside in memory RAM 43b further increases the decode speed.

To further appreciate the present invention, the relationship of the preprocessor 49 and the microprocessor 44 must be explained in more detail. FIG. 4 shown an overview of the program flow of the microprocessor 44. The first thing the program does is try to locate the areas in memory where there is a high probability that valid barcode data resides. Bear in mind the microprocessor, without a margin flag or vector, would be forced to search through up to several thousand 8 bit counts to find a valid label and hence slowing decoding speed. Here a margin vector table created as described above by preprocessor 49 points out all of the locations in RAM where 10:1 ratios exist thereby simplifying and speeding up this task. The program first checks at 61 to see if any margins were seen during a cycle. If any margins are found, the program then checks at 62 to make sure it is from the scan currently being analyzed.

Figure 5:
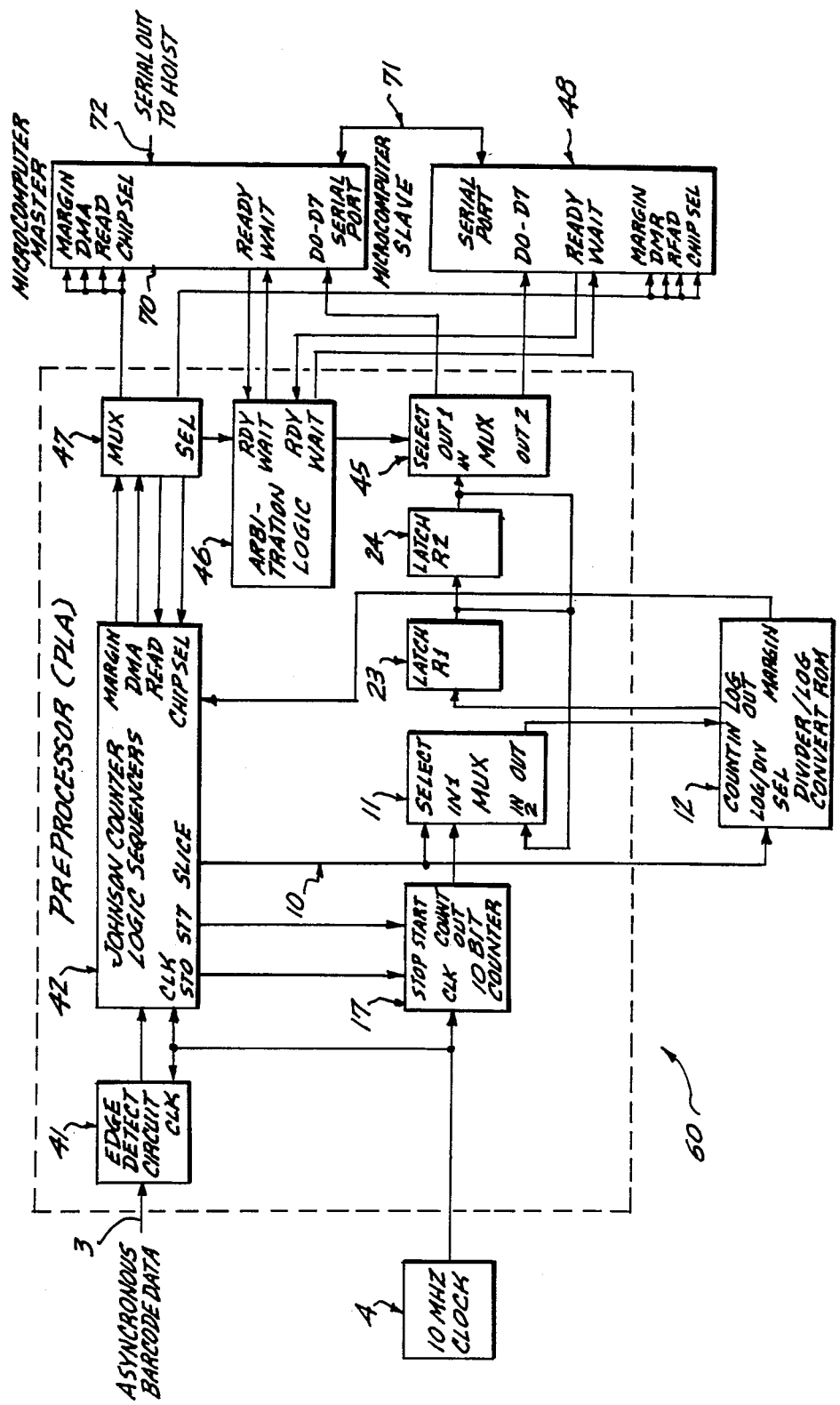
FIG. 5 is a block diagram of an alternate embodiment of a barcode decoder, similar to the one shown in FIG. 1, except for the provision of plural microprocessors operating in parallel to further enhance the decoding speed.

To further enhance the speed of the barcode decoder, another embodiment shown in FIG. 5 is disclosed. The preprocessor 49 described earlier is modified as preprocessor 60 to allow sending its barcount data 32 to one of two parallel microprocessors 70 and 48. While parallel processing is known per se, it traditionally raises the problem of how to efficiently divide the task between one or more processors. A barcode scanning system lends itself perfectly to a parallel system since the individual scans are totally independent of one another, thus giving unusually great efficiency in the division of the barcode decoding task. To accomplish the implementation, the preprocessor 60 has two multiplexers added 45 and 47 whose function is to couple the interface line to either the master microprocessor 70 or the slave processor 48. The preprocessor 60 arbitration logic 46 will transfer data to whichever processor is ready first. Otherwise, the preprocessor 60 is essentially the same in operation as the previously described processor 49 except for the above mentioned circuits.

Each microprocessor 70 and 48 evaluates data from different scans of the barcode scanner independently. Once either processor has completed a valid barcode read the master processor 70 takes control, via the serial communication port 71 linking the two microprocessors, and either halts further processing by the slave processor 48 or instructs it to continue if more valid reads are required. Once a valid barcode has been decoded it is sent by the master processor 70 to a host computer via serial link 72.

The arbitration circuit 46 is a logic circuit that controls the two multiplexers 45 and 47 that couple the barcount data and the related interface lines margin and DMA request to either the master microprocessor 70 or the slave microprocessor 48. The ready line from each microprocessor is monitored by the arbitration logic 46, and whichever one goes active first will receive the barcount from the next scan. The arbitration circuit will switch the multiplexers 45 and 47 at the end of the scan to the other microprocessor. In the event that the microprocessor is still busy, wait signal activated, the arbitration circuit will wait for the active ready line and switch the data to that processor.

Figure 6:
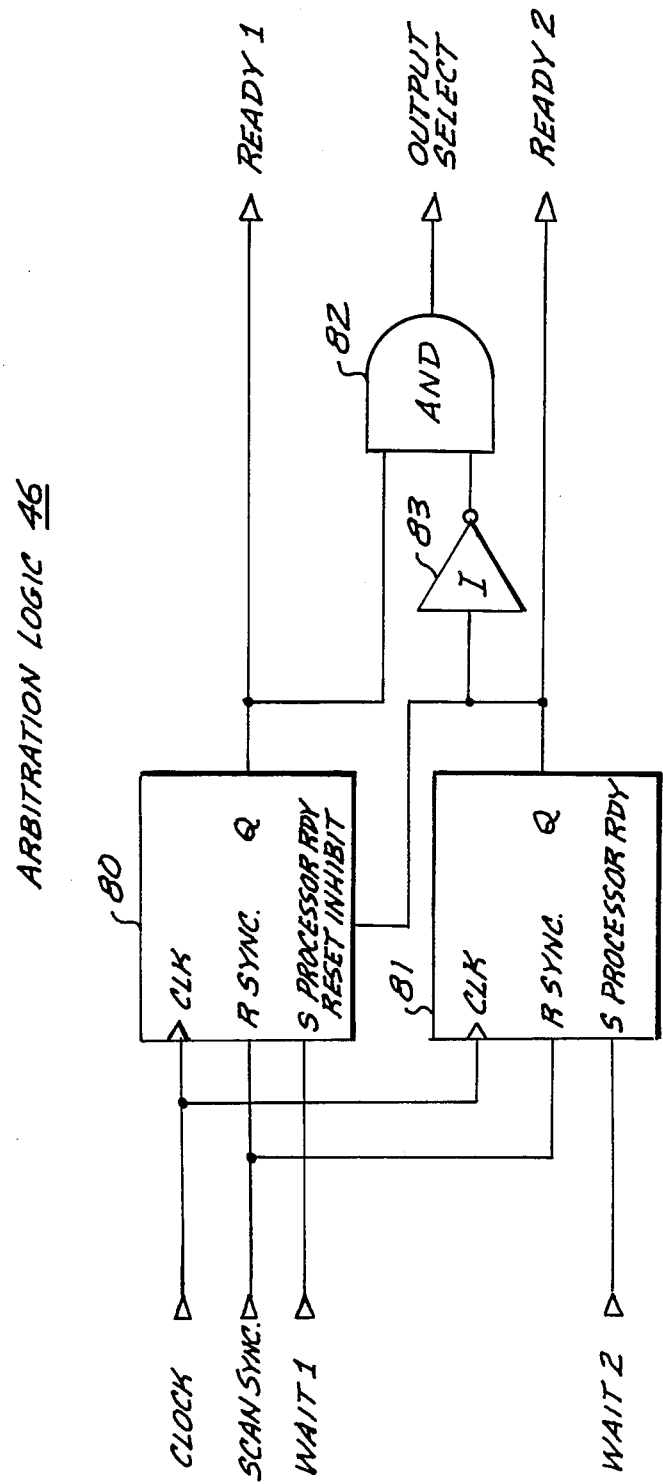
FIG. 6 is a logic circuit diagram of one of the logic block elements of FIG. 5.

The arbitration circuit 46 is shown in detail in FIG. 6 to include RS flip-flops 80 and 81 and output logic gate 82 and inverter 83 and functions as follows: when scan sync becomes active, the microprocessor currently selected will be deactivated by unasserting the microprocessor's ready line. Immediately after this, both wait lines are checked to see if one or both are unasserted. If both are unasserted, the slave processor 48 will always be selected because the master processor has the host interface communications task, which can add overhead in some cases, so it makes sense to give the data to the slave whose only task is barcode reading. Otherwise, whichever wait line unasserts first, the arbitration circuit will select that processor to receive the next scan's data by asserting the appropriate ready line. When the other processor is ready, it will unassert its wait line and the arbitration circuit latches that information so at the end of the current scan the data will be switched to this processor.

As described herein the present invention advances the state of the art of decoding barcode information through the provision of a scan data preprocessor. The invention comprehends the measurement of elapsed time with a uniquely selected log conversion ROM and computing the ratios of the widths of barcoded segments by simple subtraction. When the implementation is in the terms of a preprocessor coupled to a microprocessor, the additional functions of the preprocessor consisting of separating bars and spaces in RAM and identifying the margin locations, permits decoding and reading of the barcoded data by an inexpensive microprocessor at very high throughput data rates with a minimum of hardware.

While only particular embodiments have been disclosed, it will be apparent to those skilled in this art that numerous changes can be made thereto without departing from the essence of the invention as set forth in the following claims.

What is claimed is:

1. In a system for decoding data scanned at a relatively high rate from barcode symbols, the combination comprising:
    a preprocessor for receiving and preprocessing a scanned space and bar signal information, and a microprocessor cooperating with said preprocessor for completing decoding of said signal information and having a word length n;
    said preprocessor comprising:
       edge detect logic means for detecting the occurrence of edges of said space and bar signal information;
       primary counter logic means for receiving clock pulses of a predetermined frequency and performing a binary count up to a predetermined maximum count of C where $C=2^{n'}$, and $n'$=the number of binary bits of said primary counter logic means;
       sequencing logic means connected to said edge detect logic means and to said primary counter logic means for causing said primary counter logic means to perform a binary count of said clock pulses to represent the widths of spaces and bars in said space and bar signal information;
       log conversion logic means for converting said binary counts of spaces and bars to log counts L represented by integers in a range from 0 to a maximum of $2^n$;
       ratio logic means for detecting quiet zone margins from consecutive log counts L developed by said log conversion logic means, and producing a margin flag signal in response to log counts L having ratios equal to or greater than a predetermined ratio of space to bar widths; and
       latch logic means for latching and transferring log counts L to said microprocessor; and
    wherein said microprocessor has RAM means for storing said log counts L of space and bar widths at predetermined address areas, and for storing margin location data in the form of addresses of said log counts L that point to the memory locations of those space and bar counts at or adjacent to said predetermined quiet zone margins.

2. The system of claim 1, wherein the base b of said log conversion logic means is selected in accordance with the following relationship:

$b = 10^{(\log C)/L}$.

3. The system of claim 1, wherein said log conversion logic means has an associated ROM lookup table for receiving binary count C from said primary counter logic means and said ROM lookup table outputs said log of count L as space or bar width data.

4. The system of claim 1, wherein said ratio logic means has an associated ROM lookup table for receiving log counts L representing adjacent space and bar widths and for producing said margin flag signal when said predetermined width ratio is represented by a predetermined difference value.

5. The system of claim 1, wherein said sequencing logic means causes log counts L representing spaces and bars to be stored in consecutive addresses in said RAM and with log counts of said spaces all in odd or all in even address locations, and log count for bars stored in the adjacent consecutive addresses.

6. In the system of claim 1, said sequencing logic means including means for enabling the operation of said ratio logic means for determining quiet zone margins and for causing said margin location data to be stored in said microprocessor RAM means.

7. The system of claim 1, wherein said latch logic means comprises a first latch for storing a most recent log count L of a bar or space developed by said primary counter logic means, and a second latch for storing the preceding log of L count of an adjacent space or bar respectively; and wherein said ratio logic means receives log counts L for determining said quiet zone margin from said first and second latches.

8. The system of claim 1, wherein said microprocessor has a DMA control, and said log count data of space and bar widths is loaded from said latch logic means into said RAM means via DMA loading.

9. The system of claim 1, wherein said sequence logic means comprises at least a first Johnson counter having a clock input for receiving the clock pulses and an enable input connected to said edge detect logic means for enabling said first Johnson counter to count clock pulses in response to each detected edge of space and bar signal information.

10. The system of claim 9, wherein said first Johnson counter counts through predetermined count states of x, where x is less than said maximum count C performed by said primary counter logic means, and said first Johnson counter causing said primary counter logic means to start counting only after said first Johnson counter receives a predetermined number of clock pulses not greater than x, so as to filter out spurious noise signals from said edge detect logic means, said primary counter logic means starting its count from a preset value equal to said predetermined number.

11. The system of claim 10, wherein said sequence logic means comprises a second Johnson counter having a plurality of y output counting states, said second Johnson counter having a clock input signal connected to receive said clock pulses and an enable control input responsive to said first Johnson counter for enabling said second Johnson counter only after said first Johnson counter reaches a count state greater than said predetermined number, and wherein one of said states y of said second Johnson counter causes said ratio logic means to detect said quiet zone margin.

12. The system of claim 11, further comprising means responsive to said second Johnson counter for signaling said microprocessor to load log counts L of spaces and bars into said RAM, and to generate a table in said RAM of address data where log counts of spaces and bars adjacent said quiet zone margins are located.

13. The system of claim 1, wherein said preprocessor comprises a programmable gate array, whereby each of said edge detect, primary counter, sequencing, log conversion, ratio and latch logic means are configured from a plurality of logic gates in said programmable logic array.

14. The system of claim 1, further comprising an additional parallel microprocessor having a separate RAM means, and wherein said preprocessor comprises selection logic means for selectively loading log counts of spaces and bars into said RAM means of said first name microprocessor or into said RAM means of said additional microprocessor, said first name microprocessor and said additional microprocessor performing parallel, concurrent decode processing of preprocessed barcode log counts selectively delivered by said preprocessor means.

15. In a system for decoding data scanned at a relatively high rate from barcode symbols, the combination comprising:
a preprocessor for receiving and preprocessing a scanned space and bar signal information, and first and second microprocessors cooperating with said preprocessor for completing decoding of said signal information,
said preprocessor comprising:
edge detect logic means for detecting the occurrence of edges of said space and bar signal information;
primary counter logic means for receiving clock pulses of a predetermined frequency and performing a binary count up to a predetermined maximum count of C;
sequencing logic means connected to said edge detect logic means and to said primary counter logic means for causing said primary counter logic means to perform a binary count of said clock pulses to represent the widths of spaces and bars in said space and bar signal information;
log conversion logic means for converting said binary counts of spaces and bars to log counts;
ratio logic means for detecting quiet zone margins from consecutive log counts developed by said log conversion logic means, and producing a margin flag signal in response to log counts having ratios equal to or greater than a predetermined ratio of space to bar widths;
latch logic means for latching said log counts; and
arbitration/selection logic means connected to said latch logic means for transferring log counts to either said first or second microprocessor in response to ready/wait microprocessor status signals;
wherein each said microprocessors has RAM means for storing said log counts of space and bar widths at predetermined address areas, and for storing margin location data in the form of addresses of said log counts that point to the memory locations of those space and bar counts at or adjacent to said predetermined quiet zone margins, and ready/wait output means, said arbitration/selection logic means connected to said ready/wait output means of said first and second microprocessors.

16. The system of claim 15, wherein said primary counter logic means of said preprocessor has n' bits for count of $C=2^{n'}$, and wherein said first and second microprocessors have a word length of n, said log conversion log means has a log base b selected according to the following relationship:

$$B=10^{(Log\ C)/L}$$

where $L \leq 2^n$, so that the count C when converted to log form is represented by a whole number L that can be represented by one microprocessor word of length n bits.

17. The system of claim 15, wherein said ratio logic means has an associated ROM lookup table for receiving log counts representing adjacent space and bar widths and for producing said margin flag signal when said predetermined width ratio is represented by a predetermined difference value.

18. A preprocessor for preprocessing data scanned at a relatively high rate from barcode symbols having space and bar signal information and sending preprocessed data to a microprocessor for completing decoding and which has a characteristic word length of n, the combination comprising:
 edge detect logic means for detecting the occurrence of edges of space and bar signal information;
 primary counter logic means for receiving clock pulses of a predetermined frequency and performing a binary count up to a predetermined maximum count of C where $C=2^{n'}$, and n'=the number of binary bits of said primary counter logic means;
 means connected to said edge detect logic means and to said primary counter logic means for causing said primary counter logic means to perform a binary count of said clock pulses to represent the widths of spaces and bars in said space and bar signal information;
 log conversion logic means for converting said binary counts of spaces and bars to log counts represented by a whole number L in a range from 0 to a maximum of $2^n$; and
 wherein the base b of said log conversion logic means is selected in accordance with the following relationship:

$$b=10^{(Log\ C)/L}.$$

19. A preprocessor for preprocessing data scanned at a relatively high rate from barcode symbols, and delivering preprocessed space and bar width count data to a host processor for completing decoding, said preprocessor comprising:
 edge detect logic means for detecting the occurrence of edges of space and bar signal information;
 primary counter logic means for receiving clock pulses of a predetermined frequency and performing a binary count, said primary counter logic means being responsive to said edge detect logic means for causing said primary counter logic means to perform a binary count of said clock pulses to represent the space and bar widths as space counts and bar counts;
 log conversion logic means for converting said binary counts of space and bar widths to log counts L;
 ratio logic means for detecting quiet zone margins from consecutive log counts L developed by said log conversion logic means, and producing a margin flag signal in response to log counts L having ratios equal to or greater than a predetermined ratio of space to bar widths; and
 logic means for transferring log counts L and said margin flag signal to the host microprocessor.

20. In a method of decoding data scanned at a relatively high rate from barcode symbols, the steps comprising:
 preprocessing scanned space and bar signal information, and then completing decoding in a cooperating microprocessor having a word length n;
 said step of preprocessing comprising the substeps of:
  electrically detecting the occurrence of edges of said space and bar signal information;
  electronically performing a binary count up to a predetermined maximum count of C where $C=2^{n'}$, and n'=the number of binary bits of said binary count in response to said step of detecting occurrence of edges so as to produce binary counts representing widths of spaces and bars;
  electronically converting said binary counts of spaces and bars to log counts L represented by integers in a range from 0 to a maximum of $2^n$;
  detecting quiet zone margins from adjacent log counts L developed by said step of electronically converting, and producing a margin flag signal when adjacent log counts L have ratios equal to or greater than predetermined ratio of space to bar widths; and
  transferring log counts L to said microprocessor; and
 wherein said step of completing decoding in said microprocessor includes the substeps of storing said log counts L of space and bar widths at predetermined address areas in a RAM, and storing margin location data in the form of RAM addresses of said log counts L that point to the memory locations in RAM of those space and bar log counts at or adjacent to said predetermined quiet zone margins.

* * * * *